United States Patent
Borschert et al.

(10) Patent No.: US 7,476,067 B2
(45) Date of Patent: Jan. 13, 2009

(54) DRILL BIT

(75) Inventors: Bernhard Borschert, Bamberg (DE); Ulrich Krenzer, Zirndorf (DE); Rainer Büttner, Wilhermsdorf (DE)

(73) Assignee: Kennametal Inc., Latrobe, PA (US)

( * ) Notice: Subject to any disclaimer, the term of this patent is extended or adjusted under 35 U.S.C. 154(b) by 319 days.

(21) Appl. No.: 11/337,099

(22) Filed: Jan. 20, 2006

(65) Prior Publication Data

US 2006/0204345 A1   Sep. 14, 2006

Related U.S. Application Data

(63) Continuation-in-part of application No. PCT/EP2004/005974, filed on Jun. 3, 2004.

(30) Foreign Application Priority Data

Jul. 23, 2003  (DE)  ............... 103 33 340.1

(51) Int. Cl.
B23B 51/06  (2006.01)
(52) U.S. Cl. ........................ 408/59; 408/230
(58) Field of Classification Search .................. 408/57, 408/59–61, 229, 230; 409/135, 136; B23B 51/06
See application file for complete search history.

(56) References Cited

U.S. PATENT DOCUMENTS

| | | | | |
|---|---|---|---|---|
| 1,144,088 A | * | 6/1915 | Ains | 408/59 |
| 2,325,973 A | * | 8/1943 | Nurnberger et al. | 408/59 |
| 2,786,373 A | * | 3/1957 | Patton | 408/59 |
| 3,037,264 A | * | 6/1962 | Mossberg | 407/11 |
| 3,040,605 A | * | 6/1962 | Andreasson | 408/59 |
| 3,045,513 A | * | 7/1962 | Andreasson | 408/59 |
| 3,436,990 A | | 4/1969 | Tourison | |
| 4,340,327 A | | 7/1982 | Martins | |
| 4,606,680 A | * | 8/1986 | Striegl | 408/156 |
| 4,643,621 A | * | 2/1987 | Fuller et al. | 408/57 |
| 4,890,963 A | * | 1/1990 | Keritsis | 408/59 |
| 4,950,108 A | * | 8/1990 | Roos | 408/59 |
| 5,304,181 A | * | 4/1994 | Caspari et al. | 606/80 |
| 5,350,261 A | * | 9/1994 | Takaya et al. | 408/229 |
| 5,478,176 A | * | 12/1995 | Stedt et al. | 408/59 |
| 5,704,740 A | * | 1/1998 | Ebenhoch et al. | 408/59 |
| 5,800,101 A | * | 9/1998 | Jindai et al. | 408/230 |
| 6,045,301 A | | 4/2000 | Kammermeier et al. | |
| 6,116,825 A | * | 9/2000 | Kammermeier et al. | 408/1 R |
| 6,210,083 B1 | * | 4/2001 | Kammermeier et al. | 408/1 R |
| 6,439,811 B1 | * | 8/2002 | Wardell | 407/54 |
| 6,481,938 B2 | * | 11/2002 | Widin | 408/226 |

(Continued)

FOREIGN PATENT DOCUMENTS

DE   10157450 A1   6/2003

(Continued)

*Primary Examiner*—David P Bryant
*Assistant Examiner*—Eric A Gates
(74) *Attorney, Agent, or Firm*—Larry R. Meenan

(57) ABSTRACT

A drill bit having a shank portion and a cutting portion, which cutting portion generally has at least one cutting edge and a chip flute that has a helical portion. The drill bit has at least one straight coolant channel that has a coolant exit orifice disposed at least partially in the flute and oriented toward the cutting edges to supply coolant thereto to cool the cutting edges and chips produced during a cutting operation.

20 Claims, 12 Drawing Sheets

U.S. PATENT DOCUMENTS

| | | | |
|---|---|---|---|
| 7,101,125 B2 * | 9/2006 | Borschert et al. | 408/230 |
| 2002/0172569 A1 | 11/2002 | Nakamura | |
| 2004/0042859 A1 * | 3/2004 | Edvardsson et al. | 408/230 |
| 2005/0084352 A1 * | 4/2005 | Borschert et al. | 408/226 |
| 2005/0244235 A1 * | 11/2005 | Kleiner | 408/59 |

FOREIGN PATENT DOCUMENTS

| | | |
|---|---|---|
| EP | 0589333 A1 | 3/1994 |
| EP | 0750960 B1 | 1/1997 |
| EP | 1100642 B1 | 5/2001 |
| EP | 0790092 B1 | 1/2002 |
| JP | 06320323 A * | 11/1994 |
| JP | 09309017 A * | 12/1997 |
| JP | 2003340626 A * | 12/2003 |
| WO | WO94/12305 | 6/1994 |
| WO | WO 03/047797 A1 * | 6/2003 |

* cited by examiner

FIG 4
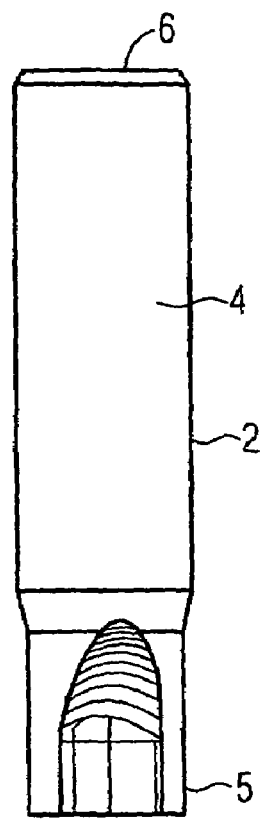
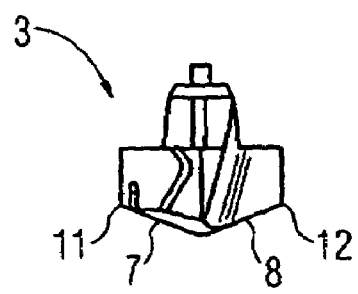

DRILL BIT

CONTINUING APPLICATION DATA

This application is a Continuation-In-Part application of International Patent Application No. PCT/EP2004/005974, filed on Jun. 3, 2004, which claims priority from Federal Republic of Germany Patent Application No. 103 33 340.1, filed on Jul. 23, 2003. International Patent Application No. PCT/EP2004/005974 was pending as of the filing date of this application. The United States was an elected state in International Patent Application No. PCT/EP2004/005974.

BACKGROUND

1. Technical Field

The present application relates to a drilling tool, especially for metallic materials, with generally at least two cutting edges and each with an at least partially spiraled flute extending from the cutting edges toward the tool shaft. This type of a drill bit is known from EP 0 750 960 B1, for example.

2. Background Information

Machining tools, especially drill bits, are often operated using cooling lubricants that are supplied to the tool's cutting edge or edges through coolant channels inside the tool. In the tool described in EP 0 750 960 B1, the central channel extending from the shaft-end splits into multiple sub-channels to which flute-shaped cross-channels break off at right angles at the cutting side end of the drill bit. The coolant supply is thus designed in a very complex manner.

U.S. Pat. No. 3,436,990 describes a drill with a central cooling channel which toward the forward drill tip divides into subchannels which are oriented diagonally outward with respect to the longitudinal axis of the drill. DE 101 57 450 A1 is concerned with the problem of feeding the coolant into the rear-side end of the drill shank and provides an insert via which the coolant is fed into the drill shank without large-angle deflections.

OBJECT OR OBJECTS

The object is to describe a drill bit with a particularly simple design and effective coolant supply.

SUMMARY

In accordance with the present application, the task is solved by means of a drill with at least two cutting edges and an at least partly helical chip flute extending from each of said cutting edges toward a shank end, comprising cooling channels that begin from the shank end and run continuously parallel to the tool axis, the outlet openings of which cooling channels are located in the chip flutes and are oriented toward the cutting edges.

This drill bit has at least two cutting edges as well as two partially spiraled flutes extending from the cutting-side end of the drill bit toward the shaft-end. Each cutting edge is assigned a coolant channel that extends from an inlet opening on the shaft-end to an outlet opening in the flute in such a manner that the coolant or cooling lubricant is fed directly and in the tool's longitudinal direction to the cutting edge. The coolant channel runs completely or mostly straight in its entire length and is at least generally parallel to the tool axis.

The completely straight construction of the number of coolant channels corresponding to the number of cutting edges, but no less than two, favors efficient manufacturing of the drill bit. In addition, the continuously straight coolant channels also have flow-related advantages, especially when using minimal lubrication that operates using an air-oil mixture. Besides the low-resistance flow, not requiring the cooling lubricant to be rerouted within the drill bit is particularly relevant. Separation of the oil-air mixture, as may occur particularly with angular routing, is avoided. The tool can thus be used with small quantities of oil even at high machining speeds.

Additional advantages of this tool result from the fact that the cooling lubricant is supplied to the cutting edge from the coolant channel's opening that is recessed axially from the tool tip.

Any weakening of the tool in especially mechanically stressed areas of the tool tip is excluded by the coolant channel's outlet openings being recessed in the direction of the tool shaft. Preferentially, the axial distance between the center of the coolant channel's outlet opening and a cutting edge corner adjoining the cutting edge at the tool's circumference amounts to a minimum of 75% of the tool diameter and a maximum of double the tool diameter.

Compared to a coolant discharge on the tool's exterior, the discharge of the coolant at least generally in the tool's longitudinal direction has the advantage that cooling and/or lubrication is effective when applying the drill bit to the piece to be machined. In contrast, for outlet openings arranged on the tool's exterior through which the cooling lubricant is discharged radially outward with a movement component, the desired effectiveness of the cooling lubricant is not achieved before the drill bit along with the outlet opening penetrates into the workpiece.

In cutting operations, the cooling lubricant fed through the coolant channels preferentially does not strike the cutting edge, but rather strikes the chip formed by it or between the chip and the face. From a cross-sectional view of the tool, the twist angle between the outlet opening of the coolant channel and the cutting edge is at least −20° but no more than +45°, in particular at least −5° and no more than +15°. The angle of twist is thus defined as positive if the coolant channel's outlet opening precedes the tool's rotation. On the cutting edge not directly cooled by the cooling lubricant flowing out from the coolant channel's outlet openings, high temperatures may develop during cutting. This is particularly favorable for machining hard materials since thereby their typically highly temperature-dependent mechanical properties are intentionally utilized. The coolant jet striking the chip directly quenches it and thus tends to result in small fragmenting properties depending on the machined material. Thereby, one achieves the transfer of a large portion of the cutting heat to the chip and easy chip removal. The percentage of cutting heat transferred to the drill bit is kept comparatively low so that the drill bit expands only slightly during machining. This enables an especially high degree of manufacturing precision to be achieved during drilling.

The eccentric path of the coolant channels prevents weakening of the tool in the area of its axis. The mechanical stability of the entire tool is substantially influenced by the geometry of the flute. Preferentially, the flute's overall angle of twist, i.e., the angle between the cutting-side and shaft-side ends of the flute, is at least 90° and no more than 160°, especially at least 120° and no more than 160°. This results in a cross-sectional geometry of the drill bit on the shaft-side end of the flute that is especially well suited to absorb the forces incurred during cutting. The aforementioned angles refer to a dual-cutting edge drilling tool. For triple- and multiple-cutting edge drill bits, lesser overall angles of twist are advantageous.

The drill bit's flutes preferentially have a larger angle of twist in the area of the drill bit tip than in the area facing the shaft. The angle of twist increasing toward the tool tip, also referred to as side-rake angle, promotes simple chip removal, while the comparatively low angle of twist in the area facing away from the tool tip allows for a completely straight design of the coolant channels even for longer drill bit embodiments, for example for drilling depths of more than triple the drill bit diameter. Preferentially, the drill bit is fluted linearly in the area adjoining the shaft.

The drill bit is constructed as a one-piece or multiple-piece unit, for example using screwed-on or soldered cutting inserts. According to a preferred design, the drill bit comprises a body and a tool tip that can be attached to it. The coolant channels thus run preferentially solely through the body. Thus, the coolant channels do not adversely impact the mechanical stability of the particularly stressed tool tip. The drill bit is therefore also suited for smaller diameters of less than 16 mm. Preferentially, the tool tip is held to the body without a screw connection and thus without any corresponding cross-sectional weakening of the body or tool tip.

The particular advantage of this embodiment is that in a drill bit with a partially linear and partially spiraled flute, an eccentric coolant channel runs completely straight and is aimed directly at the chip created during machining.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Several embodiments are explained in greater detail hereafter using drawings.

FIG. 4 depicts a tool tip as well as a section of a multi-part drill bit's body;

DESCRIPTION OF EMBODIMENT OR EMBODIMENTS

The same parts are labeled identically in all drawings.

Figure 1:
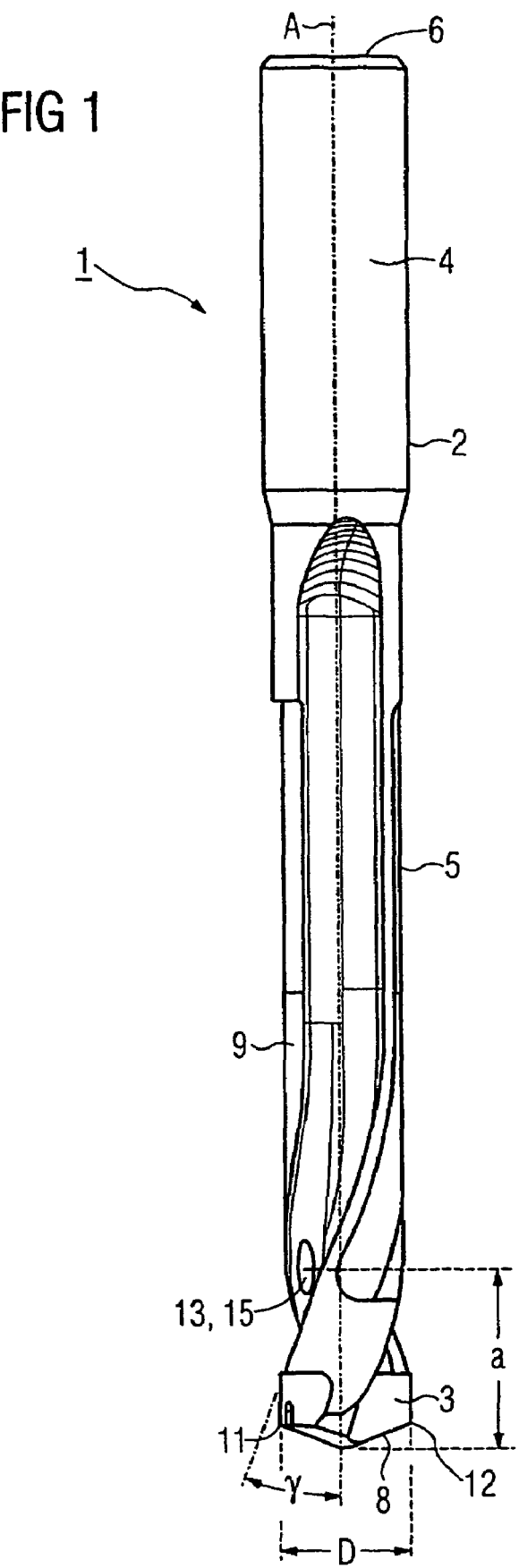
FIG. 1 depicts a side view of a drill bit.
Figure 2:
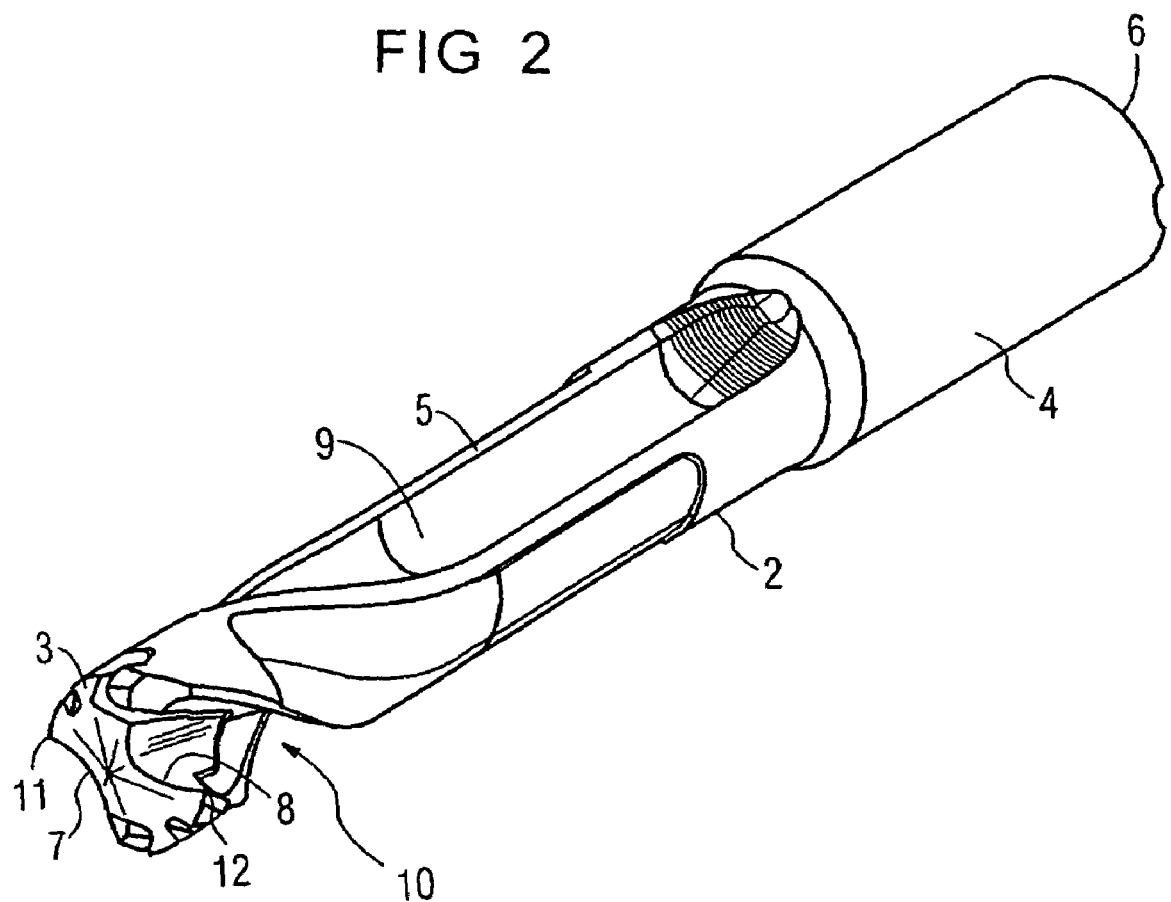
FIG. 2 depicts the drill bit according to FIG. 1 from a foreshortened perspective.
Figure 3A:
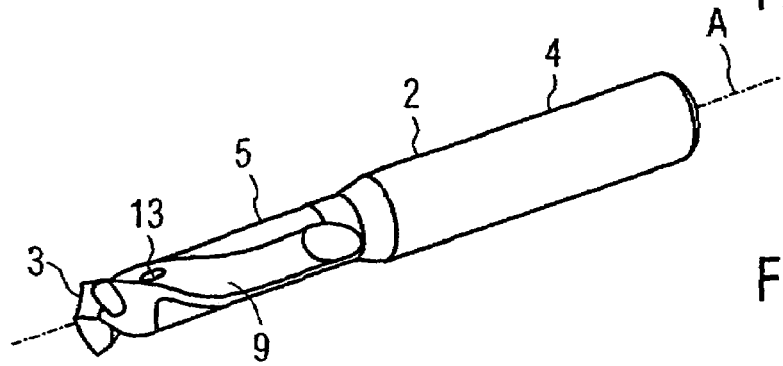
FIGS. 3a-d depict various embodiments of drill bits from a foreshortened perspective.
Figure 3B:
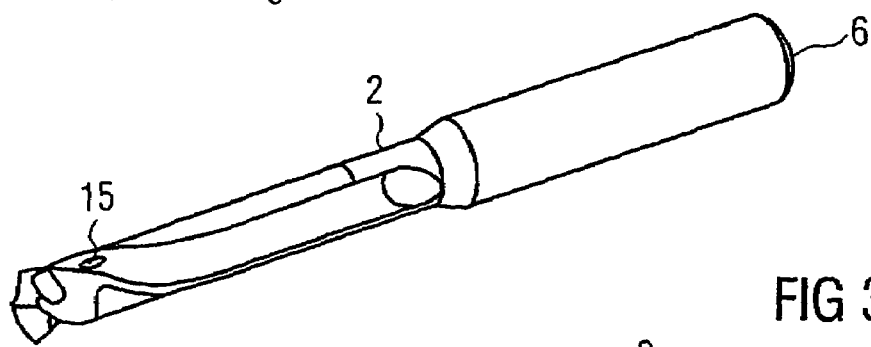
Figure 3C:
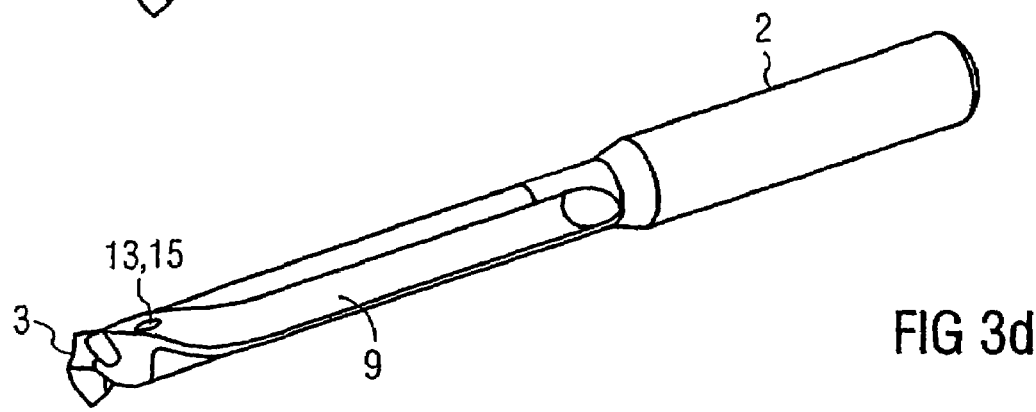
Figure 3D:
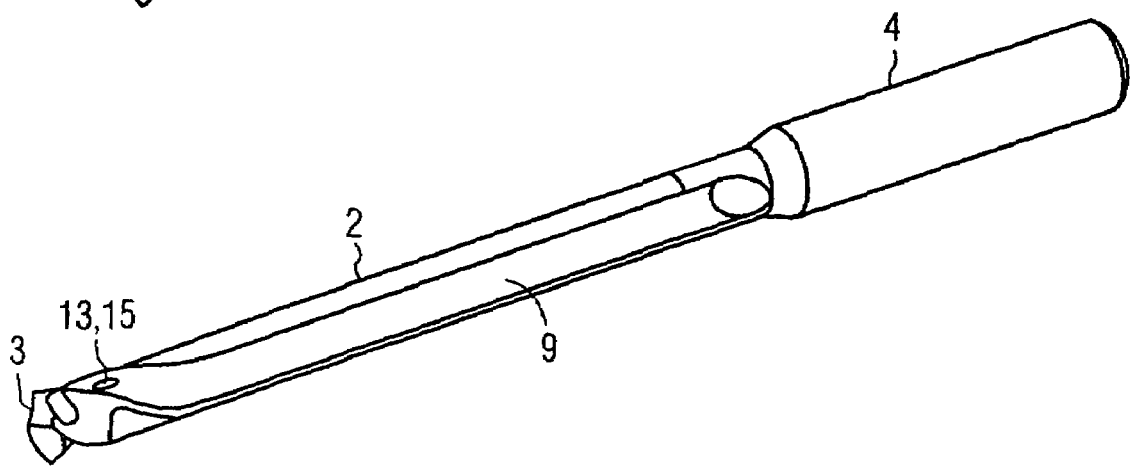

FIGS. 1 and 2 depict an initial embodiment of drill bit 1, also referred to as tool, which is comprised of body 2 and tool tip 3. Body 2 is preferentially made of steel, while tool tip 3 is preferentially made of carbide metal. Differing from the embodiment depicted, drill bit 1 may also be made out of a single piece of carbide metal. Drill bit 1 may also have several exchangeable cutting elements, for example indexable inserts. All materials or parts thereof, including ceramics, conventionally used in cutting technology can be used as materials for drill bit 1. For cutting elements or coatings, polycrystalline diamonds (PCD) or cubic boronitride (CBN) are suitable. In at least one embodiment, the entire drill bit 1 is made integrally as a single piece without any interchangeable parts or portions.

Drill bit 1 comprises shaft 4 to which is attached a cutting part 5, which in turn comprises tool tip 3. Shaft 4, whose shaft ends are labeled with reference symbol 6, is drawn as a cylindrical shaft in the embodiment. Shaft shapes that differ from this can also be implemented.

Tool tip 3 has two cutting edges 7, 8 from which flutes 9, 10 each extend in the direction of shaft end 6. The cutting edge corners formed at the transition between cutting edges 7, 8 and the tool circumference of drill bit 1 are labeled 11, 12. Coolant channels 13, 14 are provided for coolant supply to cutting edges 7, 8; their outlet openings 15, 16 are arranged in flutes 9, 10. In FIG. 1, one can only see outlet opening 15. The axial distance a, in relation to tool axis A, between the center of outlet opening 15 and the cutting edge corners 11, 12 is approximately 10% to 25% greater than the tool diameter D of drill bit 1.

FIGS. 3a to 3d depict four additional embodiments of drill bit 1, which each differ in the length of cutting part 5. In each embodiment, body 2 comprises a front, spiraled area of flutes 9, 10 in which they transition into tool tip 3. The angle of twist γ (FIG. 1) in the area of tool tip 3 is greater than 15°. This ensures low cutting forces, good chip forming, and simple chip evacuation. A straight-fluted area is attached in the direction of shaft 4 on the twisted or spiraled area of flutes 9, 10, whereby in the depicted embodiments, the spiraled section that has a constant twist angle γ within a length of less than double the tool diameter D transitions continuously into the straight-fluted area. While the straight-fluted area can be done away with in relatively short embodiments of tool 1 (FIG. 3a), it may comprise the greater part of the cutting part 5 in longer embodiments. In embodiments according to FIGS. 3a to 3d, the maximum drilling depth is three, five, seven or 10 times the tool diameter D. In each case, coolant channels 13, 14, of which only outlet opening 15 of coolant channel 13 is visible in the drawings, running parallel to tool axis A are formed completely straight.

FIG. 4 depicts a section of body 2 corresponding roughly to embodiments according to FIGS. 3a to 3d as well as tool tip 3 inserted in body 2. Possible shapes of tool tip 3 are described, for example, in still unpublished German patent application 102 07 257.4-14 as well as the corresponding international application PCT/EP03/01526. With the possibility of screw-less attachment of tool tip 3 to body 2, drill bit 1 is especially suited for smaller drilling diameters, for example starting at 12 mm. Tool tip 3 does not comprise any coolant channels.

Figure 5:
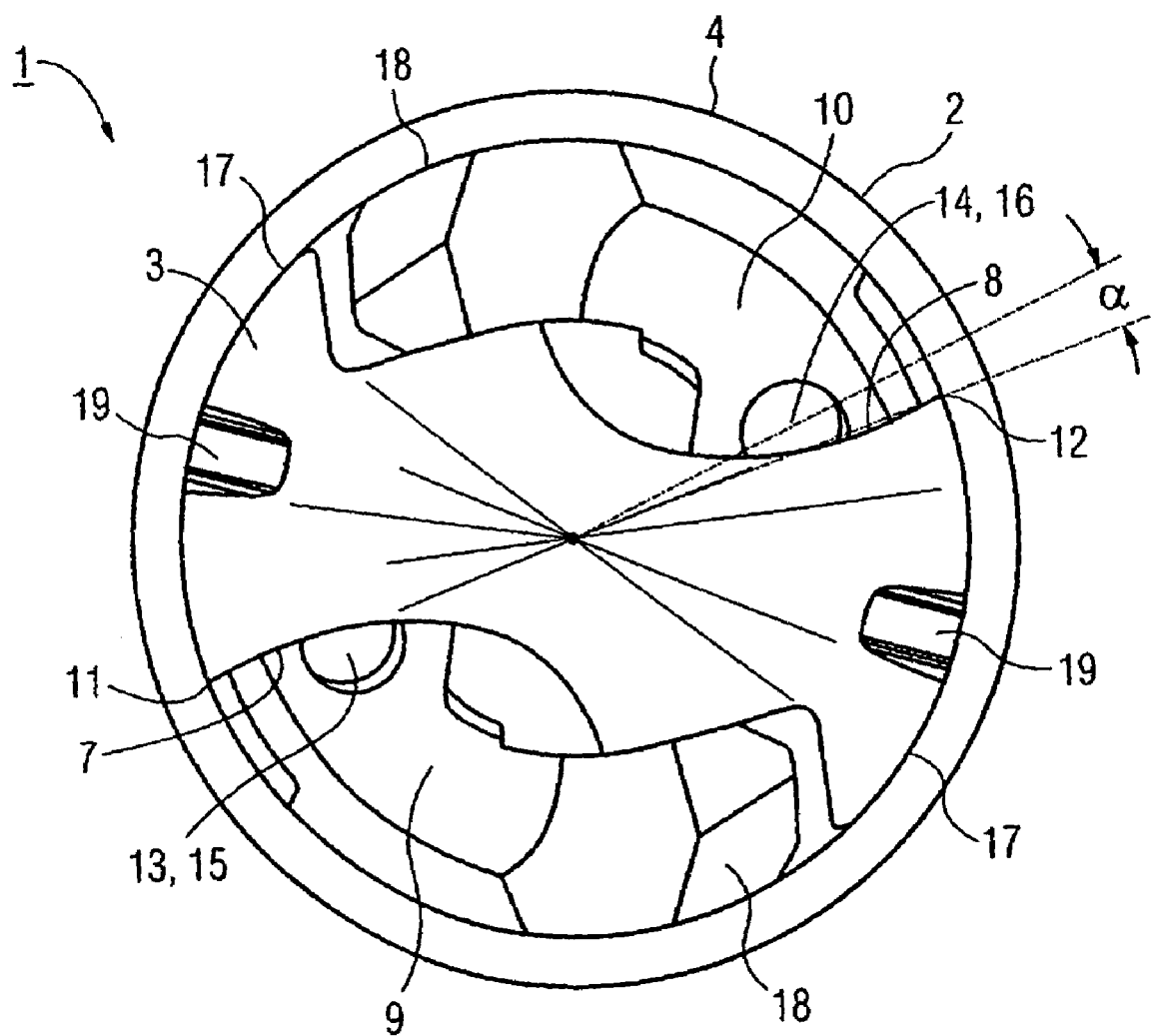
FIG. 5 depicts a top view of a drill bit's tip.

FIG. 5 depicts a top-view of tool tip 3 of drill bit 1 according to FIGS. 1 and 2. Tool tip 3 depicted as a one-piece cutting element comprises two lobes 17, corresponding to the number of cutting edges 7, 8, which each rest against shank 18 of body 2. Tool tip 3 can thus be inserted in body 2 in the manner of a slide lock. Twisting of tool tip 3 relative to body 2 is possible by means of a tool not depicted, which engages with two grooves 19 of tool tip 3.

As can be seen in FIG. 5, each cutting edge 7, 8 cuts across the cross-section of coolant channels 13, 14. The angle between cutting edge corner 11, 12 and the center of coolant channels 13, 14 is designated as twist angle $\alpha$ and preferentially amounts to between $-5°$ and $+15°$. Coolant channels 13, 14 run perpendicular to the depicted plane.

Figure 6:
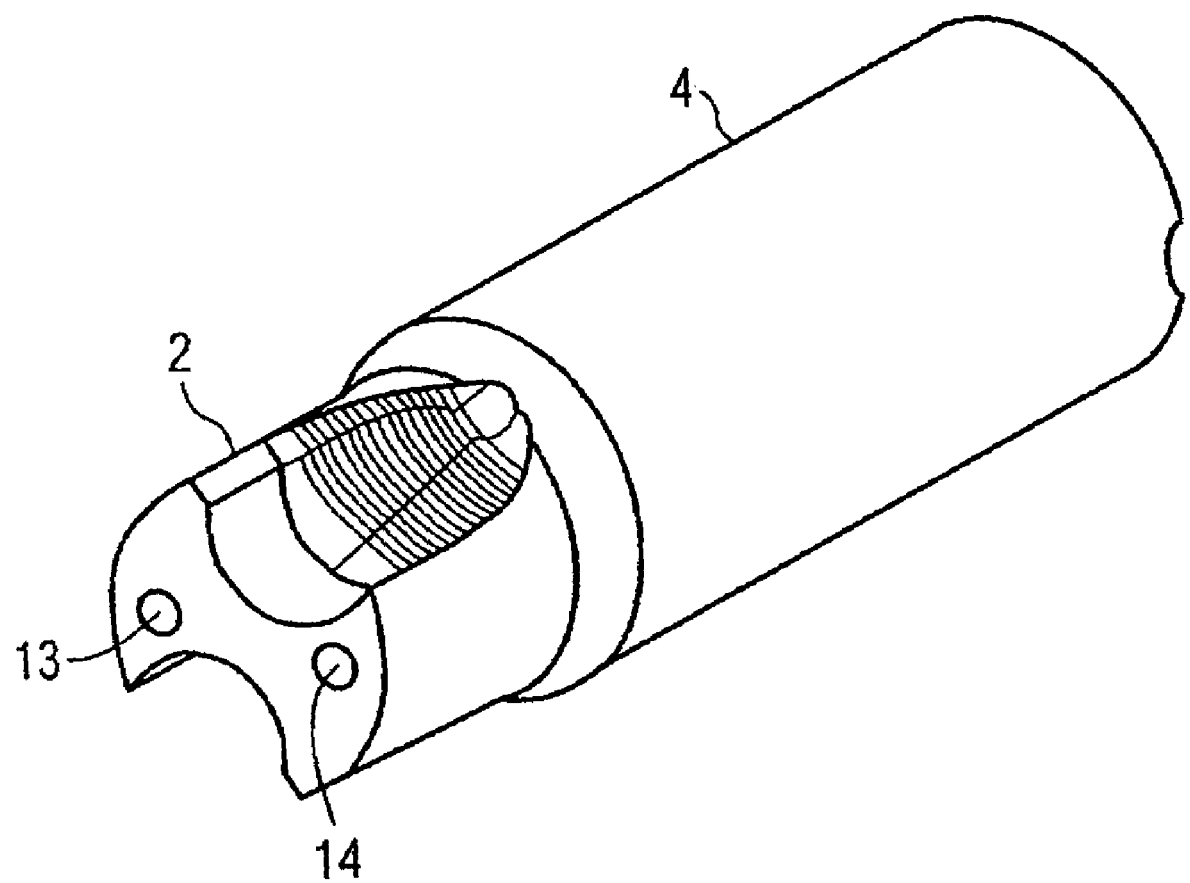
FIG. 6 depicts a foreshortened view of a section of the body according to FIG. 4.
Figure 7:
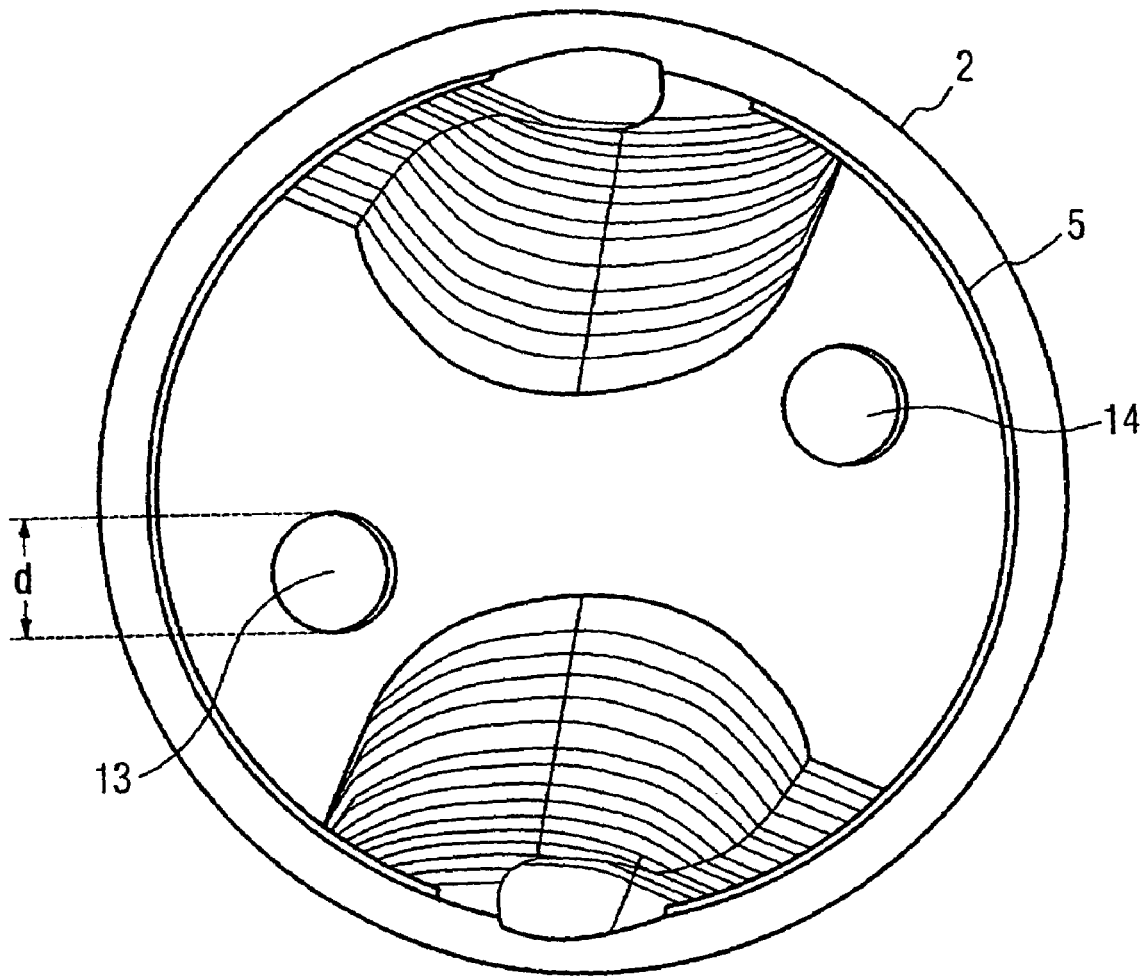
FIG. 7 depicts a top view of the sectionally depicted body according to FIG. 6.

In FIG. 6, one can see coolant channels 13, 14 in the sectionally depicted body 2. Coolant channels 13, 14 are set apart from tool axis A and thus from the weakest cross-sectional area of body 2 in such a way that even with relatively large coolant channels 13, 14, the mechanical stability of body 2 is basically not affected. The coolant channel diameter d (FIG. 7) is approx. 10 to 15% of the tool diameter D of tool tip 3.

Figure 8:
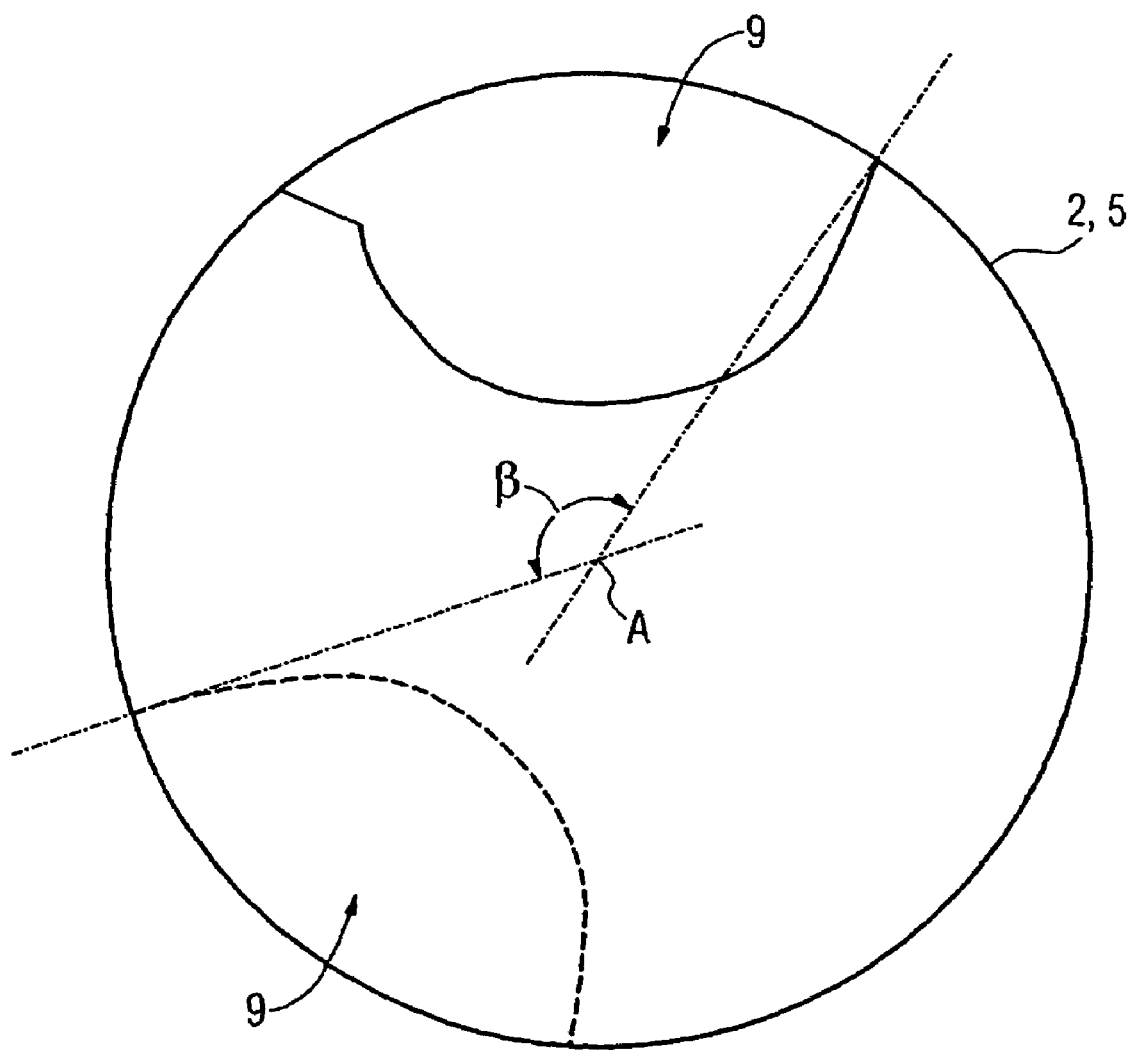
FIG. 8 schematically depicts various drill bit cross-sections.

FIG. 8 schematically depicts the course of flute 9 along tool axis A. The contour of flute 9 is depicted in the straight-fluted area adjoining shaft 4; broken lines depict the contour of flute 9 in the area of cutting edge corner 11. The total angle around which flute 9 is spiraled is labeled as total twist angle $\beta$. The second flute 10 is not depicted in FIG. 8. The total twist angle $\beta$ is measured from 90 to 160° in such a manner that essentially a cross-sectional profile of body 2 having a double-T shape absorbs the forces of cutting edges 7, 8 transferred to body 2 in the straight-fluted area facing shaft 4.

Figure 9:
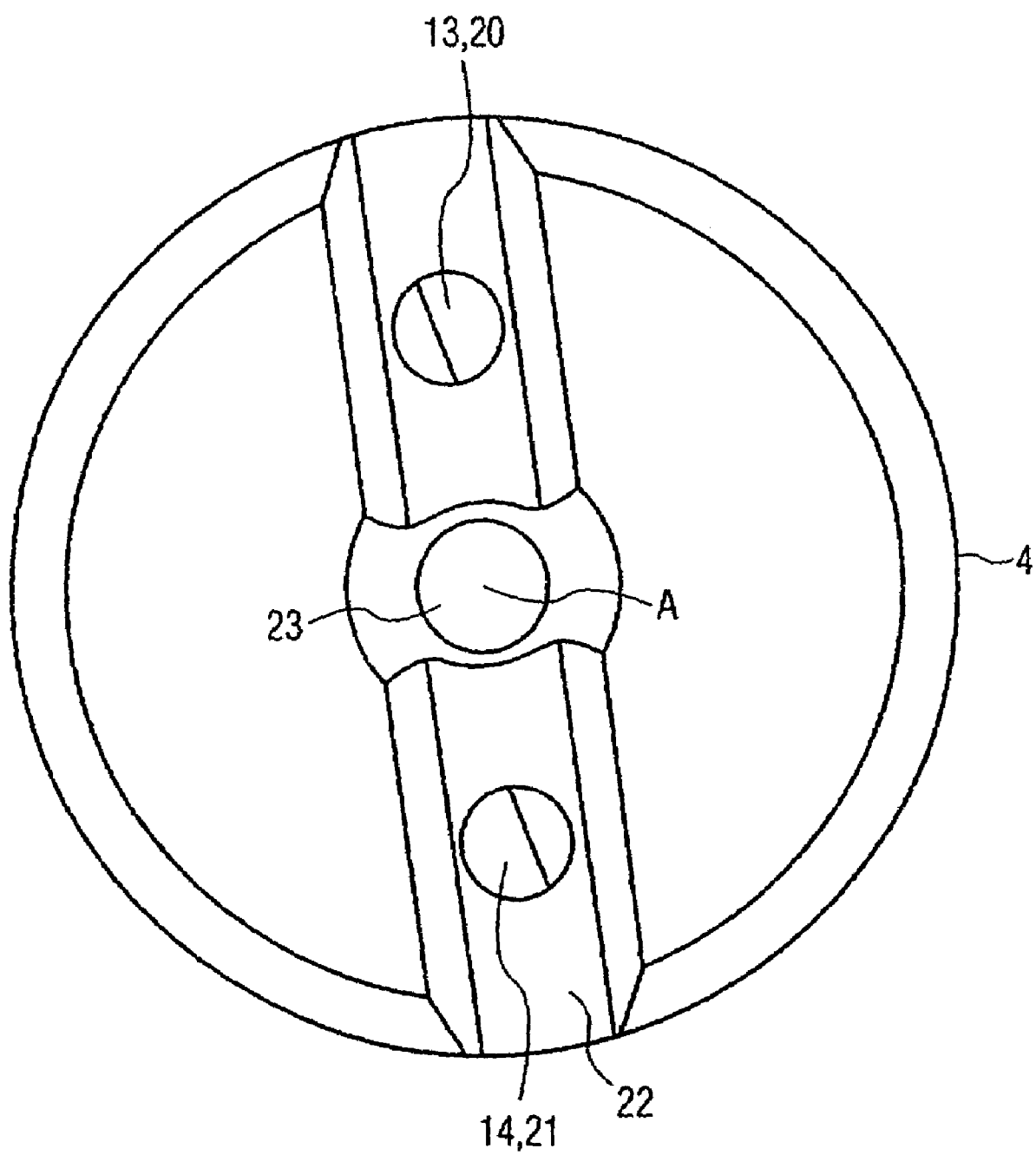
FIG. 9 depicts a rear view of the body according to FIG. 4.

FIG. 9 depicts a rear-view of body 2 with coolant channels 13, 14 whose inlet openings 20, 21 are arranged on shaft end 6 in transverse slot 22. A centering cone 23 is located symmetrically to tool axis A. Coolant supply to this area is not provided.

Figure 10:
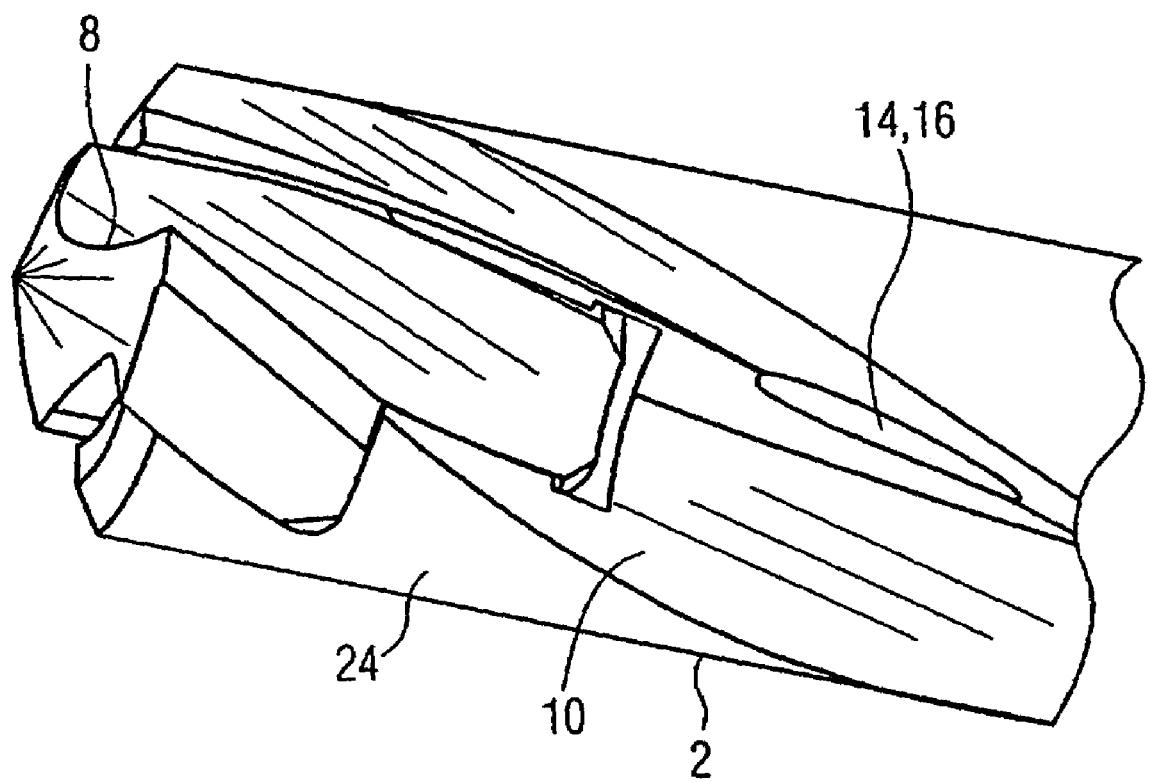
FIG. 10 depicts a foreshortened detailed view of a body with tool tip attached.
Figure 11:
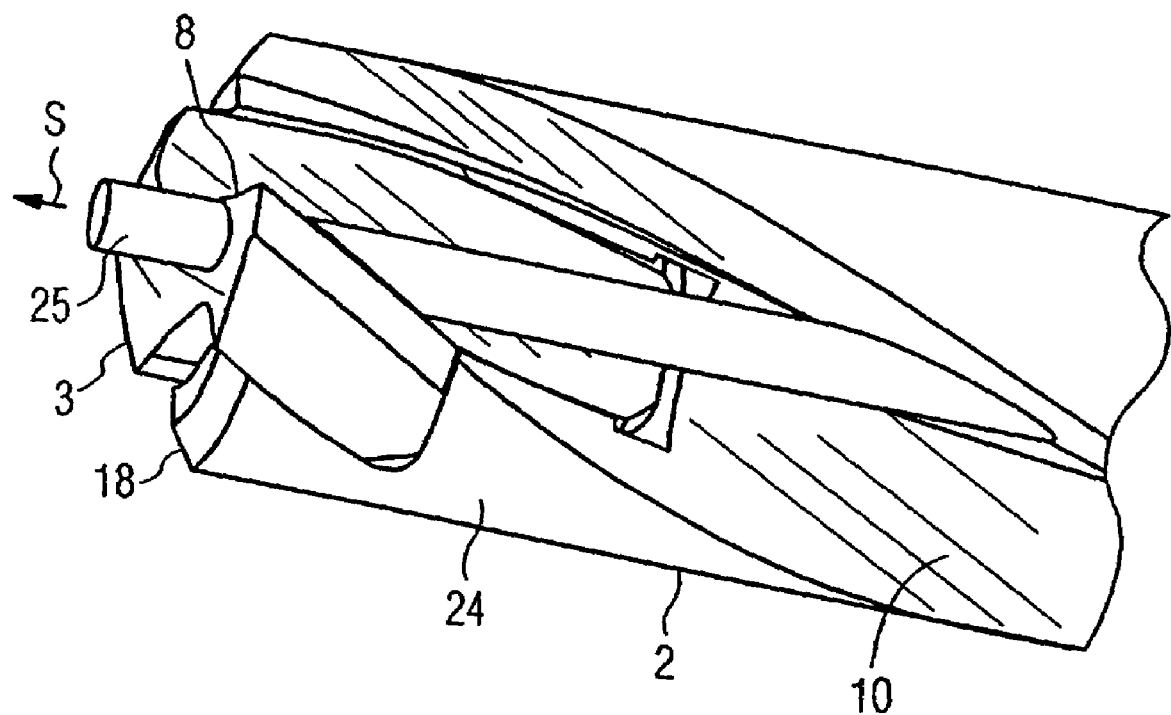
FIG. 11 schematically depicts, as in FIG. 10, the coolant supply to the tool tip.

FIG. 10 depicts in detail another embodiment of drill bit 1 comprised of body 2 and tool tip 3. In this case, outlet openings 15, 16 are located on the edge of flutes 9, 10, i.e., near the transition area toward back side 24 of drill bit 1. FIG. 11 schematically depicts the course of coolant jet 25 in the vicinity of cutting edge 7, 8 on tool tip 3. The portion of coolant jet 25 penetrating tool tip 3 is only depicted to geometrically clarify jet direction S of the coolant, which is essentially parallel to tool axis A. In fact, coolant jet 25 strikes the chip produced at cutting edges 7, 8 so that it is intensively cooled by direct coolant impact briefly after producing the chip. Heat transfer from chip to drill bit 1 is thus substantially prevented. At the same time, a high temperature that is preferential for cutting hard materials can be reached at cutting edges 7, 8. By orienting coolant jet 25 within the cross-section of drill bit 1 along tool axis A, cooling and lubrication is effective directly right upon applying drill bit 1 to the workpiece to be machined.

Figure 12:
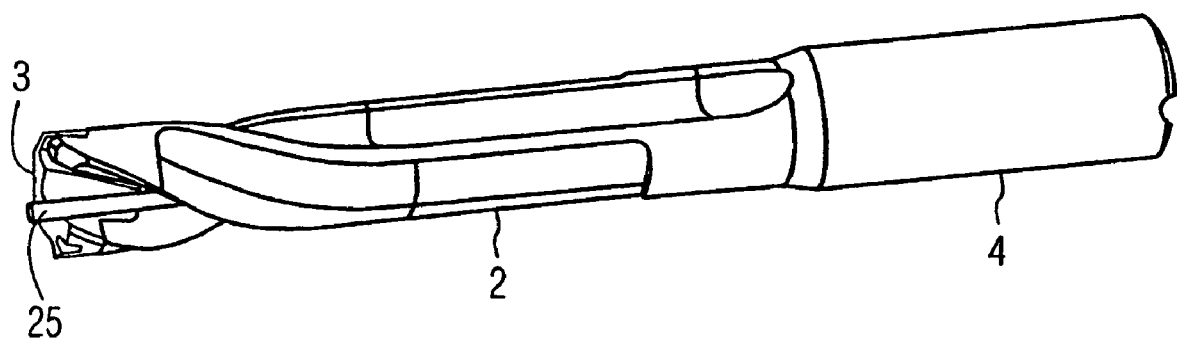
FIG. 12 depicts a full view of the tool according to FIG. 11.

Similar to FIG. 11, FIG. 12 depicts drill bit 1 with schematically indicated coolant jet 25. The completely straight conduction of cooling lubricant through drill bit 1 provides for a very low-resistance flow, whereby no separation effects occur. Drill bit 1 is thus especially suited for minimum quantity lubrication.

To further explain, in at least one possible embodiment, the axial distance a is determined by measuring the distance between two imaginary parallel lines, which lines are perpendicular to the central longitudinal axis A. One of the two lines intersects with the geometric center point of at least one of the outlet openings 15, 16, and the other of the lines runs tangentially to the conical point of the drill tip 3. The tool diameter D, is defined by measuring the distance between the two cutting edge corners 11, 12. The angle of twist $\gamma$ is an angle formed between the central longitudinal axis A and an imaginary line drawn tangentially to the edge of one of the flutes 9, 10 essentially following the path of travel of the edge. This edge is the transition between the flute 9, 10 and the back side 24 of the drill bit 3. The twist angle $\alpha$ is an angle formed between two imaginary lines drawn radially from and perpendicular to the central longitudinal axis A. One of the two lines intersects with the geometric center point of one of the outlet openings 15, 16, and the other of the lines intersects with a corresponding one of the cutting edge corners 11, 12. The total twist angle $\beta$ is an angles formed by two imaginary lines drawn radially from and perpendicular to the central longitudinal axis A. Each of the two lines intersect, for example, with the edge of flute 9, but at two different cross-sectional locations of the drill bit 3. One of the two lines intersects with a point on the edge of the flute 9 adjacent the shaft 4, and the other of the two lines intersects with a different point on the edge of the flute 9 at the cutting edge corner 11. By taking two cross-sectional slices of the drill bit 3 at these two locations and then superimposing one over the other, the two lines define the total twist angle $\beta$.

In at least one possible embodiment, the drill bit could possibly have only one cutting edge and one corresponding flute.

One feature or aspect of an embodiment is believed at the time of the filing of this patent application to possibly reside broadly in a drill bit with at least two cutting edges and each with an at least partially spiraled flute extending from them to a shaft end, characterized by coolant channels extending from the shaft end parallel to tool axis, whose outlet openings are arranged in the flutes and oriented toward the cutting edges.

Another feature or aspect of an embodiment is believed at the time of the filing of this patent application to possibly reside broadly in a drill with at least two cutting edges and an at least partly helical chip flute extending from each of said cutting edges toward a shank end, characterized by cooling channels that begin from the shank end and run continuously parallel to the tool axis, the outlet openings of which cooling channels are located in the chip flutes and are oriented toward the cutting edges.

Yet another feature or aspect of an embodiment is believed at the time of the filing of this patent application to possibly reside broadly in a drill bit characterized by a total twist angle of flute of at least 90°.

Still another feature or aspect of an embodiment is believed at the time of the filing of this patent application to possibly reside broadly in a drill bit characterized by a total twist angle of flute of 160° maximum.

A further feature or aspect of an embodiment is believed at the time of the filing of this patent application to possibly reside broadly in a drill bit characterized in that the flute has an angle of twist that increases to the cutting edge.

Another feature or aspect of an embodiment is believed at the time of the filing of this patent application to possibly reside broadly in a drill bit characterized in that the flute does not have a spiraled area.

Yet another feature or aspect of an embodiment is believed at the time of the filing of this patent application to possibly reside broadly in a drill bit characterized by a twist angle between outlet opening of the coolant channel and the cutting edge of at least $-20°$.

Still another feature or aspect of an embodiment is believed at the time of the filing of this patent application to possibly reside broadly in a drill bit characterized by a twist angle between outlet opening of the coolant channel and the cutting edge of 45° maximum.

A further feature or aspect of an embodiment is believed at the time of the filing of this patent application to possibly reside broadly in a drill bit characterized by an axial distance between the outlet opening of the coolant channel and a cutting edge corner adjoining the cutting edge on the tool circumference of at least 75% of the tool diameter.

Another feature or aspect of an embodiment is believed at the time of the filing of this patent application to possibly reside broadly in a drill bit, characterized by an axial distance between the outlet opening of the coolant channel and a cutting edge corner adjoining the cutting edge on the tool circumference of twice the tool diameter maximum.

Yet another feature or aspect of an embodiment is believed at the time of the filing of this patent application to possibly reside broadly in a drill bit characterized by a tool tip that can be attached to a body.

Still another feature or aspect of an embodiment is believed at the time of the filing of this patent application to possibly reside broadly in a drill bit characterized in that the outlet opening of the coolant channel is arranged in the body.

One feature or aspect of an embodiment is believed at the time of the filing of this patent application to possibly reside broadly in a drill bit having a central longitudinal axis, said drill bit comprising: a cutting portion being configured to cut an object; a shank portion being configured to be inserted in a tool holder; said shank portion having a first end connected to said cutting portion and a second end opposite said first end; said cutting portion comprising: at least two cutting edges; at least two chip flutes extending from said cutting edges towards said shank portion; and said chip flutes each comprising a helical portion at least substantially adjacent to a corresponding one of said cutting edges; at least two cooling channels being disposed to run continuously parallel to said central longitudinal axis from said second end of said shank portion towards said cutting portion; each of said cooling channels comprising an outlet opening being configured and disposed to direct coolant toward a corresponding one of said cutting edges; and at least a portion of each of said outlet openings being disposed in its corresponding one of said chip flutes.

Another feature or aspect of an embodiment is believed at the time of the filing of this patent application to possibly reside broadly in a drill bit comprising a total twist angle (β) of each of said chip flutes of at least 90° and at most 160°.

Still another feature or aspect of an embodiment is believed at the time of the filing of this patent application to possibly reside broadly in a drill bit wherein each of said chip flutes has an angle of twist (γ) that increases to its corresponding cutting edge; and each of said chip flutes comprises a straight portion.

Yet another feature or aspect of an embodiment is believed at the time of the filing of this patent application to possibly reside broadly in a drill bit comprising a twist angle (α), between said outlet opening of each of said coolant channels and its corresponding cutting edge, of at least −20° and at most 45°.

A further feature or aspect of an embodiment is believed at the time of the filing of this patent application to possibly reside broadly in a drill bit comprising an axial distance (a), between said outlet opening of each of said coolant channels and its corresponding cutting edge corner adjoining its corresponding cutting edge on the circumference of said cutting portion, of at least 75% of the diameter of said cutting portion and at most twice the diameter of said cutting portion.

Another feature or aspect of an embodiment is believed at the time of the filing of this patent application to possibly reside broadly in a drill bit wherein: said cutting portion comprises a body portion and a removable cutting tip portion configured to be removably attached to said body portion; and said outlet opening of each of said coolant channels is disposed in the land of said cutting portion adjacent a corresponding one of said chip flutes.

Still another feature or aspect of an embodiment is believed at the time of the filing of this patent application to possibly reside broadly in a drill bit comprising: a cutting portion being configured to cut an object; a shank portion being configured to be inserted in a tool holder; said cutting portion comprising: at least two cutting edges; at least two chip flutes extending from said cutting edges towards said shank portion; and said chip flutes each comprising a helical portion at least substantially adjacent to a corresponding one of said cutting edges; at least two cooling channels being disposed to run continuously straight from said shank portion towards said cutting portion; each of said cooling channels comprising an outlet opening being configured and disposed to direct coolant toward a corresponding one of said cutting edges; and at least a portion of each of said outlet openings being disposed in its corresponding one of said chip flutes.

Yet another feature or aspect of an embodiment is believed at the time of the filing of this patent application to possibly reside broadly in a drill bit comprising a total twist angle (β) of at least one of said chip flutes of at least 90° and at most 160°.

A further feature or aspect of an embodiment is believed at the time of the filing of this patent application to possibly reside broadly in a drill bit wherein at least one of said chip flutes has an angle of twist (γ) that increases to its corresponding cutting edge.

Another feature or aspect of an embodiment is believed at the time of the filing of this patent application to possibly reside broadly in a drill bit wherein each of said chip flutes comprises a straight portion.

Still another feature or aspect of an embodiment is believed at the time of the filing of this patent application to possibly reside broadly in a drill bit comprising a twist angle (α), between said outlet opening of at least one of said coolant channels and its corresponding cutting edge, of at least −20° and at most 45°.

Yet another feature or aspect of an embodiment is believed at the time of the filing of this patent application to possibly reside broadly in a drill bit comprising an axial distance (a), between said outlet opening of at least one of said coolant channels and its corresponding cutting edge corner adjoining its corresponding cutting edge on the circumference of said cutting portion, of at least 75% of the diameter of said cutting portion and of at most twice the diameter of said cutting portion.

A further feature or aspect of an embodiment is believed at the time of the filing of this patent application to possibly reside broadly in a drill bit wherein: said cutting portion comprises a body portion and a removable cutting tip portion configured to be removably attached to said body portion; and said outlet opening of at least one of said coolant channels is disposed in the land of said cutting portion adjacent a corresponding one of said chip flutes.

Another feature or aspect of an embodiment is believed at the time of the filing of this patent application to possibly reside broadly in a drill bit comprising: a shank portion being configured to be inserted in a tool holder; a body portion comprising: a first portion being disposed towards said shank portion and a second portion disposed opposite said first portion; said second portion comprising a cutting edge; and a chip flute extending from said cutting edge towards said shank portion; said chip flute comprising a helical portion at least substantially adjacent to said cutting edge; a cooling channel being disposed to run continuously straight from said shank portion towards said second portion; said cooling channel comprising an outlet opening for the outlet of coolant to cool at least a portion of said second portion; and at least a portion of said outlet opening being disposed in said chip flute.

Still another feature or aspect of an embodiment is believed at the time of the filing of this patent application to possibly reside broadly in a drill bit comprising a total twist angle ($\beta$) of said chip flute of at least 90° and at most 160°.

Yet another feature or aspect of an embodiment is believed at the time of the filing of this patent application to possibly reside broadly in a drill bit wherein said chip flute has an angle of twist ($\gamma$) that increases to said cutting edge.

A further feature or aspect of an embodiment is believed at the time of the filing of this patent application to possibly reside broadly in a drill bit wherein said chip flute comprises a straight portion.

Another feature or aspect of an embodiment is believed at the time of the filing of this patent application to possibly reside broadly in a drill bit comprising a twist angle ($\alpha$), between said outlet opening of said coolant channel and said cutting edge, of at least −20° and at most 45°.

Yet another feature or aspect of an embodiment is believed at the time of the filing of this patent application to possibly reside broadly in a drill bit comprising an axial distance (a), between said outlet opening of said coolant channel and a cutting edge corner adjoining said cutting edge on the circumference of said body portion, of at least 75% of the diameter of said body portion and of at most twice the diameter of said body portion.

Still another feature or aspect of an embodiment is believed at the time of the filing of this patent application to possibly reside broadly in a drill bit wherein: said body portion comprises a body portion and a removable cutting tip portion configured to be removably attached to said body portion; and said outlet opening of said coolant channels is disposed in the land of said body portion adjacent said chip flute.

At least one embodiment of the application relates to a drill bit with at least two cutting edges and each with an at least partially spiraled or helical flute extending from them to a shaft end comprises a coolant channel extending from a shaft end and running substantially parallel to the tool axis, whose outlet openings are arranged in the flute and oriented toward the cutting edge.

The components disclosed in the various publications, disclosed or incorporated by reference herein, may possibly be used in possible embodiments of the present invention, as well as equivalents thereof.

Some examples of drills, components of which may possibly be utilized or adapted for use in at least one possible embodiment, may possibly be found in the following U.S. Pat. No. 6,688,817, entitled "Drill for drilling, a method for making a drill for drilling, and a cutting tool;" U.S. Pat. No. 6,655,882, entitled "Twist drill having a sintered cemented carbide body, and like tools, and use thereof;" U.S. Pat. No. 6,309,149, entitled "Twist drill for dry drilling;" U.S. Pat. No. 6,595,305, entitled "Drill bit, hard member, and bit body;" U.S. Pat. No. 5,904,455, entitled "Drill with a drill point part;" U.S. Pat. No. 5,829,926, entitled "Rotary tool, in particular a drill;" U.S. Pat. No. 4,659,264, entitled "Drill and indexable carbide insert therefor;" and U.S. Pat. No. 4,342,368, entitled "Rotary drills and drill bits."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

Some examples of drills having cooling channels, components of which may possibly be utilized or adapted for use in at least one possible embodiment, may possibly be found in the following U.S. Pat. No. 5,947,653, entitled "Helix drill having coolant channels and helical chip flutes;" U.S. Pat. No. 5,865,574, entitled "Drill with coolant channels and method for its manufacture;" U.S. Pat. No. 5,676,499, entitled "Drill with coolant channels and method for its manufacture;" U.S. Pat. No. 5,634,747, entitled "Spiral drill with coolant channels and method to manufacture a spiral drill;" and U.S. Pat. No. 4,213,354, entitled "Method and means for cooling down a stationary twist drill by a coolant."

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Dec. 3, 2004, and/or cited elsewhere are hereby incorporated by reference as if set forth in their entirety herein as follows: U.S. Pat. No. 3,436,990; DE 101 57 450; EP 0 589 333; and U.S. Pat. No. 6,045,301.

The corresponding foreign and international patent publication applications, namely, Federal Republic of Germany Patent Application No. 103 33 340.1, filed on Jul. 23, 2003, having inventors Bernhard Borschert, Ulrich Krenzer, and Rainer Buettner, and DE-OS 103 33 340.1 and DE-PS 103 33 340.1, and International Application No. PCT/EP2004/005974, filed on Jun. 3, 2004, having WIPO Publication No. WO 2005/018857 and inventors Bernhard Borschert, Ulrich Krenzer, and Rainer Buettner, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL LIST OF TERMS

1 Drill bit
2 Body
3 Tool tip
4 Shaft
5 Cutting part
6 Shaft end
7 Cutting edge
8 Cutting edge
9 Flute
10 Flute
11 Cutting edge corner
12 Cutting edge corner
13 Coolant channel
14 Coolant channel
15 Outlet opening
16 Outlet opening
17 Lobe
18 Shank
19 Groove
20 Inlet opening
21 Inlet opening
22 Transverse slot
23 Centering cone
24 Backside
25 Coolant jet
A Tool axis
D Tool diameter a Distance
d Coolant channel diameter
S Jet direction

What is claimed is:

1. A drill bit having a central longitudinal axis, said drill bit comprising: a cutting portion being configured to cut an object; a shank portion being configured to be inserted in a tool holder; said shank portion having a first end connected to said cutting portion and a second end opposite said first end; said cutting portion comprising: a tip comprising at least one end surface; at least two cutting edges; and at least two chip flutes extending from said cutting edges towards said shank portion; said chip flutes each comprising a helical portion being disposed at least substantially adjacent to a corresponding one of said cutting edges; at least two cooling channels being disposed in said shank and cutting portions a distance from and parallel to the central longitudinal axis; each of said chip flutes comprising a surface; each of said cooling channels comprising a coolant exit orifice being disposed at the end of its cooling channel and on the surface of its corresponding chip flute an axial distance away from its corresponding cutting edge and said at least one end surface, and being configured to permit exit of coolant to cool at least a portion of said cutting portion and chips produced during a cutting operation; each of said cooling channels being disposed to run continuously straight along the entire length thereof through said shank portion and said cutting portion; and each of said coolant exit orifices being disposed to face toward its corresponding cutting edge to direct the flow of coolant in a substantially axial direction toward its corresponding cutting edge and chips produced during a cutting operation to cool the cutting edge and the chips.

2. The drill bit according to claim 1, further comprising a total twist angle ($\beta$) of each of said chip flutes of at least 90° and at most 160°.

3. The drill bit according to claim 2, wherein:
each of said chip flutes has an angle of twist ($\gamma$) that increases to its corresponding cutting edge; and
each of said chip flutes comprises a straight portion.

4. The drill bit according to claim 3, further comprising a twist angle ($\alpha$), between said outlet opening of each of said coolant channels and its corresponding cutting edge, of at least −20° and at most 45°.

5. The drill bit according to claim 4, wherein the axial distance between said outlet opening of each of said coolant channels and its corresponding cutting edge corner adjoining its corresponding cutting edge on the circumference of said cutting portion is at least 75% of the diameter of said cutting portion and at most twice the diameter of said cutting portion.

6. The drill bit according to claim 5, wherein:
said cutting portion comprises a body portion and a removable cutting tip portion configured to be removably attached to said body portion; and
said outlet opening of each of said coolant channels is disposed in the land of said cutting portion adjacent a corresponding one of said chip flutes.

7. A drill bit having a central longitudinal axis, said drill bit comprising: a cutting portion being configured to cut an object; a shank portion being configured to be inserted in a tool holder; said cutting portion comprising: a tip comprising at least one end surface; at least two cutting edges; and at least two chip flutes extending from said cutting edges towards said shank portion; said chip flutes each comprising a helical portion being disposed at least substantially adjacent to a corresponding one of said cutting edges; at least two cooling channels being disposed in said cutting portion a distance from and at least substantially parallel to the central longitudinal axis; each of said chip flutes comprising a surface; each of said cooling channels comprising a coolant exit orifice being disposed at the end of its cooling channel and at least partially on the surface of its corresponding chip flute an axial distance away from its corresponding cutting edge and said at least one end surface, and being configured to permit exit of coolant to cool at least a portion of said cutting portion and chips produced during a cutting operation; each of said cooling channels being disposed to run continuously straight from said shank portion to its corresponding coolant exit orifice; and each of said coolant exit orifices being disposed to face toward its corresponding cutting edge to direct the flow of coolant in a substantially axial direction toward its corresponding cutting edge and chips produced during a cutting operation.

8. The drill bit according to claim 7, further comprising a total twist angle ($\beta$) of at least one of said chip flutes of at least 90° and at most 160°.

9. The drill bit according to claim 8, wherein at least one of said chip flutes has an angle of twist ($\gamma$) that increases to its corresponding cutting edge.

10. The drill bit according to claim 9, wherein each of said chip flutes comprises a straight portion.

11. The drill bit according to claim 10, further comprising a twist angle ($\alpha$), between said outlet opening of at least one of said coolant channels and its corresponding cutting edge, of at least −20° and at most 45°.

12. The drill bit according to claim 11, wherein the axial distance between said outlet opening of at least one of said coolant channels and its corresponding cutting edge corner adjoining its corresponding cutting edge on the circumference of said cutting portion is at least 75% of the diameter of said cutting portion and of at most twice the diameter of said cutting portion.

13. The drill bit according to claim 12, wherein:
said cutting portion comprises a body portion and a removable cutting tip portion configured to be removably attached to said body portion; and
said outlet opening of at least one of said coolant channels is disposed in the land of said cutting portion adjacent a corresponding one of said chip flutes.

14. A drill bit having a central longitudinal axis, said drill bit comprising: a shank portion being configured to be inserted in a tool holder; a body portion comprising: a first portion being disposed towards said shank portion and a second portion disposed opposite said first portion; said second portion comprising a cutting edge and a tip comprising at least one end surface; and a chip flute extending from said cutting edge towards said shank portion; said chip flute comprising a helical portion being disposed at least substantially adjacent to said cutting edge; a cooling channel being disposed in said body portion parallel to and a radial distance from the central longitudinal axis; said chip flute comprising a surface; said cooling channel comprising a coolant exit orifice being disposed at the end of said cooling channel and at least partially on the surface of said chip flute an axial distance from the cutting edge and said at least one end surface and being configured to permit exit of coolant to cool at least a portion of said second portion and chips produced during a cutting operation; and said cooling channel being disposed to run continuously straight to said coolant exit orifice along a substantial portion of the length of said chip flute.

15. The drill bit according to claim 14, further comprising a total twist angle ($\beta$) of said chip flute of at least 90° and at most 160°.

16. The drill bit according to claim 15, wherein said chip flute has an angle of twist ($\gamma$) that increases to said cutting edge.

17. The drill bit according to claim 16, wherein said chip flute comprises a straight portion.

18. The drill bit according to claim 17, further comprising a twist angle ($\alpha$), between said outlet opening of said coolant channel and said cutting edge, of at least $-20°$ and at most $45°$.

19. The drill bit according to claim 18, wherein the axial distance between said outlet opening of said coolant channel and a cutting edge corner adjoining said cutting edge on the circumference of said body portion is at least 75% of the diameter of said body portion and of at most twice the diameter of said body portion.

20. The drill bit according to claim 19, wherein:
said body portion comprises a body portion and a removable cutting tip portion configured to be removably attached to said body portion; and
said outlet opening of said coolant channels is disposed in the land of said body portion adjacent said chip flute.

* * * * *